United States Patent [11] 3,576,208

[72] Inventor Donald J. Cassidy
 Plymouth, Mich.
[21] Appl. No. 854,399
[22] Filed Sept. 2, 1969
[45] Patented Apr. 27, 1971
[73] Assignee Ford Motor Company
 Dearborn, Mich.

[54] GAS TURBINE HEAT EXCHANGER AND METHOD OF MAKING
 7 Claims, 3 Drawing Figs.
[52] U.S. Cl. .................................................. 165/9,
 165/10, 277/96
[51] Int. Cl. ........................................................ F28d 19/00
[50] Field of Search ........................................... 165/8—10;
 277/96

[56] References Cited
 UNITED STATES PATENTS
 3,392,776 7/1968 Topouzian..................... 165/10X
 3,478,816 11/1969 Helms ............................ 165/9
 FOREIGN PATENTS
 679,169 9/1952 Great Britain................. 165/9

*Primary Examiner*—Albert W. Davis, Jr.
*Attorneys*—John R. Faulkner and Glenn S. Arendsen ABSTRACT: A solid lubricant for the contact surfaces between a rotating ceramic regenerator and the stationary peripheral seal is forced into the openings of the gas flow passages that will bear on the seal. The lubricant adheres to the walls forming the gas flow passages and is exposed to the bearing surfaces as the walls wear. Zinc oxide can be used as the lubricant which can be applied by preparing an aqueous base putty, forcing the putty into the passages, and heating the putty to cure the lubricating material in place.

PATENTED APR 27 1971

3,576,208

INVENTOR
DONALD J. CASSIDY
BY John R. Faulkner
Glenn S. Arendsen
ATTORNEYS

GAS TURBINE HEAT EXCHANGER AND METHOD OF MAKING

SUMMARY OF THE INVENTION

The efficiency of a gas turbine engine increases in proportion to the temperature of its operating gases. New materials such as high temperature metals and ceramics have been developed for use in manufacturing rotating heat exchangers of the drum or disc type for such high temperature operations. Difficulties have been encountered, however, in reducing the amount of wear at the bearing surfaces of the heat exchanger and rubbing seals therefor.

This invention provides a relatively inexpensive technique for lubricating the sliding surfaces between a rotating regenerator and a stationary seal. The invention is useful in both high and low temperature applications. In a gas turbine engine having a housing and a stationary seal mounted in the housing, a rotating heat exchanger is designed to fit in the housing so the periphery of the regenerator slides on the stationary seal. The regenerator typically comprises a plurality of closely adjacent gas conducting passages defined by relatively narrow walls throughout its substantially entire area including the peripheral edge at which sealing will take place. A lubricating composition is located within the passages that slide on the seal. The composition is attached to the walls of the passages so wear of the passage walls exposes the composition to the sliding surface.

The lubricating composition preferably is applied by preparing a pumpable mixture having the consistency of a putty of a solid lubricant capable of satisfactory performance at the anticipated operating temperatures, forcing the mixture into the openings of the passages that will bear on the seal member, and curing the mixture in place by the action of heat or catalysts. Useful lubricants include oxides of zinc or chromium, fluorides of lithium, calcium, sodium, potassium, magnesium, etc. or mixtures thereof. Zinc oxide is preferred because of its easy application and excellent friction properties at high temperatures with ceramic materials. Liquids used to make the mixtures are selected so curing the mixture bonds the lubricant to the walls of the regenerator core. Useful liquids include water, alcohol, etc.

When operation of an engine containing a heat exchanger made according to this invention begins, wear at the bearing surface of the seal and the heat exchanger core exposes the lubricant. Greater amounts of wear expose greater amounts of lubricant until eventually a balance is achieved between the lubricating properties and the wear rate.

DETAILED DESCRIPTION

Figure 1:
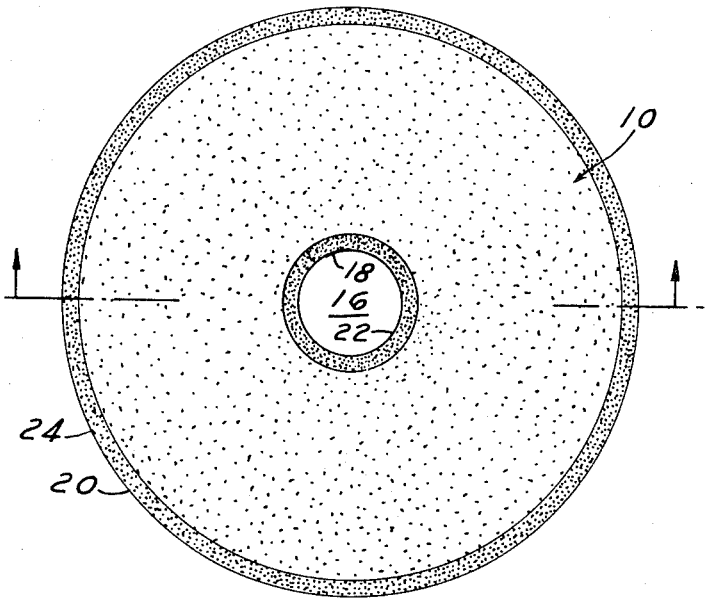
FIG. 1 is a plan view of a disc-type regenerator having a lubricating composition bonded or otherwise attached to both the inner and outer peripheries.
Figure 3:
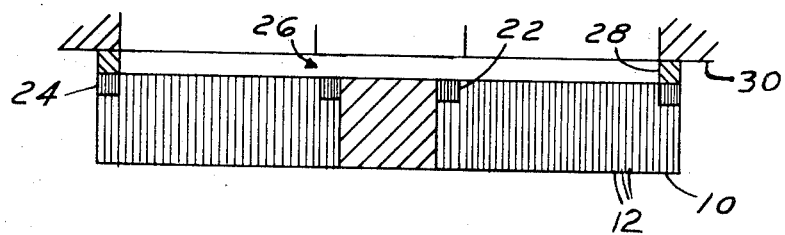
FIG. 3 is a sectional view taken along line 3-3 of FIG. 1 showing the narrow band of lubricating composition.
Figure 2:
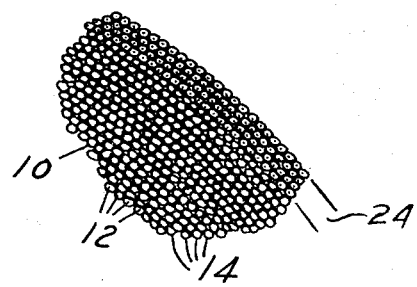
FIG. 2 is a detail of a portion of an outer periphery of a regenerator of FIG. 1.

A ceramic disc-type regenerator core is indicated in the drawings by numeral 10. Core 10 comprises a plurality of closely adjacent gas conducting passages 12 defined by relatively narrow walls 14 made of a ceramic material. Core 10 contains a central hub 16 and passages 12 and walls 14 extend from the inner periphery 18 surrounding hub 16 completely out to the outer periphery 20.

Core 10 may be manufactured by any of a variety of methods such as winding sheets of corrugated and flat ceramic into the disc shape or dipping a plurality of absorbent straws in a ceramic slurry and firing the slurry into a structural unit. A lubricating composition having the physical characteristics of a putty is prepared by mixing a particulate solid refractory material such as zinc oxide with a liquid such as water. The resulting mixture is applied in narrow bands 22 and 24 to the inner and outer peripheries of the core 10. Bands 22 and 24 typically are about one-half inch wide and from 0.010 to 0.10 inch deep. A pressurized gun typically is used to apply the mixture although the materials can be applied by hand if desired. The mixture usually fills the entire openings of passages 12 in the bands 22 and 24.

The core and mixture assembly then is fired in an oven to drive off the dispersing material and simultaneously bond the lubricating composition to the walls 14. Some of the resulting lubricating composition occasionally projects beyond walls 14 and this composition is removed by mechanical machining or grinding.

Core 10 then is installed in a gas turbine engine with band 24 bearing on peripheral seal 28 and band 22 bearing on crossarm seal 26. Seals 26 and 28 are stationary with respect to the gas turbine engine housing 30 so the core slides on the seals. Seals 26 and 28 preferably are made of materials having suitable friction and wear characteristics, which can be the same lubricating materials used in the bands.

When the engine operation begins, any wear of the edges of walls 14 exposes increasing amounts of the lubricating composition held between the walls. This exposure permits the lubricating composition to begin performing its lubricating function and the wear rate diminishes to a commercially acceptable value. Varying amounts of lubricating composition can be placed in the bands to adapt the wear rate to any desired value within reasonable limits imposed by the materials and operating conditions. The bands of lubricating material can be applied to both sides of the regenerator core and intermediate bands can be spaced along the faces of the core.

An improved technique of applying the lubricating composition includes filling the passages as described above, heating the filled core to about 150° F. to remove the water, and then heating the filled core to about 1,600° F. to presinter the zinc oxide lubricant. The resulting zinc oxide has a relatively porous structure. A highly concentrated solution of a zinc compound such as an aqueous solution of zinc nitrate then is applied to the zinc oxide, which absorbs some of the solution. The core then is heated to about 150° F. initially to remove the water and then to about 1,200° F. to convert the zinc nitrate to zinc oxide. Additional zinc nitrate solution then is applied, the core is heated to remove water and to convert the zinc nitrate into zinc oxide. These steps are repeated until thermal expansion at high temperatures does not separate the zinc oxide from the ceramic walls of the core. This technique produces a lubricated core capable of maintaining the lubricant in place at extremely high temperatures.

Other soluble zinc compounds convertible into zinc oxide and compatible with the other materials in the core can be used in this improved technique. Other solvents such as alcohol, benzene, toluene, etc. also can be used in place of water. As many as 15—30 repetitions of the solution treatment can be used to achieve desired high temperature properties.

Thus this invention provides a self-lubricating ceramic heat exchanger for a gas turbine engine that is manufactured easily and has highly desirable friction and wear properties. Wear of the heat exchanger core automatically exposes lubricating composition to the wear surfaces. Manufacturing techniques for producing a lubricated heat exchanger useful at extremely high temperatures also are provided.

I claim:

1. In a rotating heat exchanger for a gas turbine engine having a housing and a stationary seal mounted in said housing, a regenerator core comprising a plurality of closely adjacent gas conducting passages defined by relatively narrow walls extending out to the periphery of said core, said core sliding on said seal, and a lubricating composition located within passages of said core that slide on the seal, said lubricating composition being attached to the walls of the passages adjacent to said seal so wear of the passage walls exposes the lubricating composition to the surface of the seal.

2. The heat exchanger of claim 1 in which the walls defining the passages are made of ceramic materials and the lubricating composition comprises a solid refractory material.

3. The heat exchanger of claim 2 in which the regenerator core is an annular disc having said passages running generally parallel to the rotational axis of the disc, said regenerator core comprising said lubricating composition at both the inner and outer peripheries of said annular disc.

4. The heat exchanger of claim 3 in which the lubricating composition substantially fills the openings of the passages bearing on the peripheral seal.

5. A process for lubricating the sliding surfaces between a peripheral edge portion of a rotating heat exchanger and a stationary seal member in contact with said peripheral edge portion comprising:
preparing a regenerator core having a plurality of closely adjacent gas conducting passages defined by relatively narrow walls, said passages existing in substantially the entire area of said core including its outer peripheral edge,
preparing a pumpable mixture of a lubricating composition for the sliding surfaces of said core and said seal member,
forcing said mixture of lubricating composition into the openings of said passages that will bear on said seal member, and
curing said mixture in place in the openings of said passages so that wear of the walls of said core while sliding on said seal member exposes said lubricating composition to the sliding surfaces.

6. The process of claim 5 in which the walls of the regenerator core are made of a ceramic material and the mixture of lubricating composition is an aqueous base putty comprising a solid refractory material having suitable low friction and wear properties.

7. The process of claim 6 in which the refractory material is zinc oxide and comprising applying to the cured mixture a solution of a zinc compound convertible to zinc oxide by heat, removing the solvent from said applied solution, and heating the core to convert the zinc compound to zinc oxide.